US007721397B2

(12) United States Patent
Chang et al.

(10) Patent No.: US 7,721,397 B2
(45) Date of Patent: May 25, 2010

(54) METHOD FOR FABRICATING CAPACITIVE ULTRASONIC TRANSDUCERS

(75) Inventors: Ming-Wei Chang, Taichung County (TW); Tse-Min Deng, Hsinchu (TW); Te-I Chiu, Taipei County (TW); Mu-Yue Chen, Kaohsiung (TW); Da-Chen Pang, Kaohsiung (TW); Ping-Ta Tai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 552 days.

(21) Appl. No.: 11/703,910

(22) Filed: Feb. 7, 2007

(65) Prior Publication Data

US 2008/0188753 A1 Aug. 7, 2008

(51) Int. Cl.
*H01G 7/00* (2006.01)

(52) U.S. Cl. ...................... 29/25.42; 29/592.1; 29/594; 29/602.1; 29/609.1; 310/311; 310/333; 310/337; 310/357; 310/367; 324/633; 324/652; 324/655; 324/656; 347/54; 347/68; 347/69; 347/70; 347/72

(58) Field of Classification Search ................ 29/25.42, 29/592.1, 594, 602.1, 609.1; 324/633, 652, 324/655, 656; 347/54, 68–72; 310/311, 310/333–337, 357, 367
See application file for complete search history.

(56) References Cited

U.S. PATENT DOCUMENTS 6,295,247 B1 9/2001 Khuri-Yakub et al.
6,426,582 B1 7/2002 Niederer et al.
6,556,417 B2 * 4/2003 McIntosh et al. ............ 361/278
6,632,178 B1 10/2003 Fraser
6,659,954 B2 12/2003 Robinson
2008/0235936 A1 * 10/2008 Chang et al. .................. 29/594

OTHER PUBLICATIONS

Arif Sanli Ergun et al., "Capacitive Micromachined Ultrasonic Transducers: Fabrication Technology", IEEE Transactions on Ultrasonics, Ferroelectrics, and Frequency Control, vol. 52, No. 12, pp. 2242-2258, (Dec. 2005), IEEE.

D. Memmi et al., "Fabrication of capacitive micromechanical ultrasonic transducers by low-temperature process", Sensors and Actuators A 99 2002, pp. 85-91, (2002), Elsevier Science B.V.

K.A.Wong et al., "Curved Micromachined Ultrasonic Transducers", 2003 IEEE Ultrasonics Symposium on Oct. 5-8, 2003, pp. 572-576, (2003), IEEE.

L.L.Liu et al., "A Novel Method for Fabricating Capacitive Micromachined Ultrasonic Transducers with Ultra-Thin Membranes", 2004 IEEE International Ultrasonics, Ferroelectrics, and Frequency Control Joint 50$^{th}$ Anniversary Conference, pp. 497-500, (2004), IEEE.

* cited by examiner

*Primary Examiner*—Paul D Kim
(74) *Attorney, Agent, or Firm*—Alston & Bird LLP

(57) ABSTRACT

A capacitive ultrasonic transducer includes a flexible layer, a first conductive layer on the flexible layer, a support frame on the first conductive layer, the support frame including a flexible material, a membrane over the support frame being spaced apart from the first conductive layer by the support frame, the membrane including the flexible material, a cavity defined by the first conductive layer, the support frame and the membrane, and a second conductive layer on the membrane.

15 Claims, 9 Drawing Sheets

METHOD FOR FABRICATING CAPACITIVE ULTRASONIC TRANSDUCERS

BACKGROUND OF THE INVENTION

The present invention relates to an ultrasonic transducer and, more particularly, to a flexible capacitive ultrasonic transducer and a method of fabricating the same.

With the advantages of non-invasive evaluation, real-time response and portability, ultrasonic sensing devices have been widely used in medical, military and aerospace industries. For example, echographic systems or ultrasonic imaging systems are capable of obtaining information from surrounding means or from human body, based on the use of elastic waves at ultrasonic frequency. An ultrasonic transducer is often one of the important components in an ultrasonic sensing device. The majority of known ultrasonic transducers are realized by using piezoelectric ceramic. A piezoelectric transducer is generally used to obtain information from solid materials because the acoustic impedance of piezoelectric ceramic is of the same magnitude order as those of the solid materials. However, the piezoelectric transducer may not be ideal for obtaining information from fluids because of the significant impedance mismatch between piezoelectric ceramic and fluids, for example, tissues of the human body. The piezoelectric transducer may generally operate in a frequency band from 50 KHz to 200 KHz. Furthermore, the piezoelectric transducer may generally be fabricated in high-temperature processes and may not be ideal for integration with electronic circuits. In contrast, capacitive ultrasonic transducers may be manufactured in batch with standard integrated circuit ("IC") processes and therefore are integrable with IC devices. Furthermore, capacitive ultrasonic transducers are capable of operating at a higher frequency band, from 200 KHz to 5 MHz, than known piezoelectric transducers. Consequently, capacitive ultrasonic transducers have gradually taken the place of the piezoelectric transducers.

FIG. 1 is a schematic cross-sectional view of a capacitive ultrasonic transducer 10. Referring to FIG. 1, the capacitive ultrasonic transducer 10 includes a first electrode 11, a second electrode 12 formed on a membrane 13, an isolation layer 14 formed on the first electrode 11, and support sidewalls 15. A cavity 16 is defined by the first electrode 11, the membrane 13 and support sidewalls 15. When suitable AC or DC voltages are applied between the first electrode 11 and the second electrode 12, electrostatic forces cause the membrane 13 to oscillate and generate acoustic waves. The effective oscillating area of the conventional transducer 10 is the area defined by the first electrode 11 and second electrode 12. In this instance, the effective oscillating area may be determined by the length of the second electrode 12 because the second electrode 12 is shorter than the first electrode 11. Furthermore, the membrane 13 may generally be fabricated in a high-temperature process such as a conventional chemical vapor deposition ("CVD") or low pressure chemical vapor deposition ("LPCVD") process at a temperature ranging from approximately 400 to 800° C.

FIGS. 2A to 2D are cross-sectional diagrams illustrating a conventional method for fabricating a capacitive ultrasonic transducer. Referring to FIG. 2A, a silicon substrate 21 is provided, which may be heavily doped with impurities in order to serve as an electrode. Next, a first nitride layer 22 and an amorphous silicon layer 23 are successively formed over the silicon substrate 21. The first nitride layer 22 may function to protect the silicon substrate 21. The amorphous silicon layer 23 is used as a sacrificial layer and will be removed in subsequent processes.

Referring to FIG. 2B, a patterned amorphous silicon layer 23' is formed by patterning and etching the amorphous silicon layer 23, exposing portions of the first nitride layer 22. A second nitride layer 24 is then formed over the patterned sacrificial layer 23', filling the exposed portions.

Referring to FIG. 2C, a patterned second nitride layer 24' with openings 25 is formed by patterning and etching the second nitride layer 24, exposing portions of the patterned amorphous silicon layer 23' through the openings 25. The patterned amorphous silicon layer 23' is then removed by a selective etch.

Referring to FIG. 2D, a silicon oxide layer is deposited through the openings 25 to form plugs 26. Chambers 27 are thereby defined by the plugs 26, the patterned second nitride layer 24' and the first nitride layer 22. A metal layer 28 is then formed over the patterned second nitride layer 24' to serve as a second electrode.

However, the conventional capacitive ultrasonic transducer is inflexible due to the utilization of a silicon-based substrate. The inflexibility restricts the conventional capacitive ultrasonic transducer to a limited application. It may therefore be desirable to have a flexible capacitive ultrasonic transducer and a method of fabricating the same.

BRIEF SUMMARY OF THE INVENTION

Examples of the present invention may provide a capacitive ultrasonic transducer that comprises a flexible layer, a first conductive layer on the flexible layer, a support frame on the first conductive layer, the support frame including a flexible material, a membrane over the support frame being spaced apart from the first conductive layer by the support frame, the membrane including the flexible material, a cavity defined by the first conductive layer, the support frame and the membrane, and a second conductive layer on the membrane.

Some examples of the present invention may provide a method for fabricating capacitive ultrasonic transducers, the method comprising providing a substrate, forming a flexible layer on the substrate, forming a first conductive layer on the flexible layer, forming a patterned sacrificial layer on the first conductive layer, forming a first polymer layer over the patterned sacrificial layer, patterning the first polymer layer to provide a patterned first polymer layer, exposing portions of the patterned sacrificial layer through openings, forming a second conductive layer on the patterned first polymer layer, patterning the second conductive layer to provide a patterned second conductive layer, forming a second polymer layer over the patterned second conductive layer, patterning the second polymer layer, exposing portions of the patterned sacrificial layer through the openings, and removing the patterned sacrificial layer through the openings.

Examples of the present invention may also provide method of forming capacitive ultrasonic transducers, the method comprising forming a flexible layer on a substrate, forming a first conductive layer on the flexible layer, forming a patterned metal layer on the first conductive layer, forming a first polymer layer on the patterned metal layer and the first conductive layer, patterning the first polymer layer to provide a patterned first polymer layer, exposing portions of the patterned metal layer through openings, forming a patterned second conductive layer on the patterned first polymer layer, forming a patterned second polymer layer on the patterned second conductive layer and the patterned first polymer layer over the patterned metal layer, and removing the patterned metal layer through the openings.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
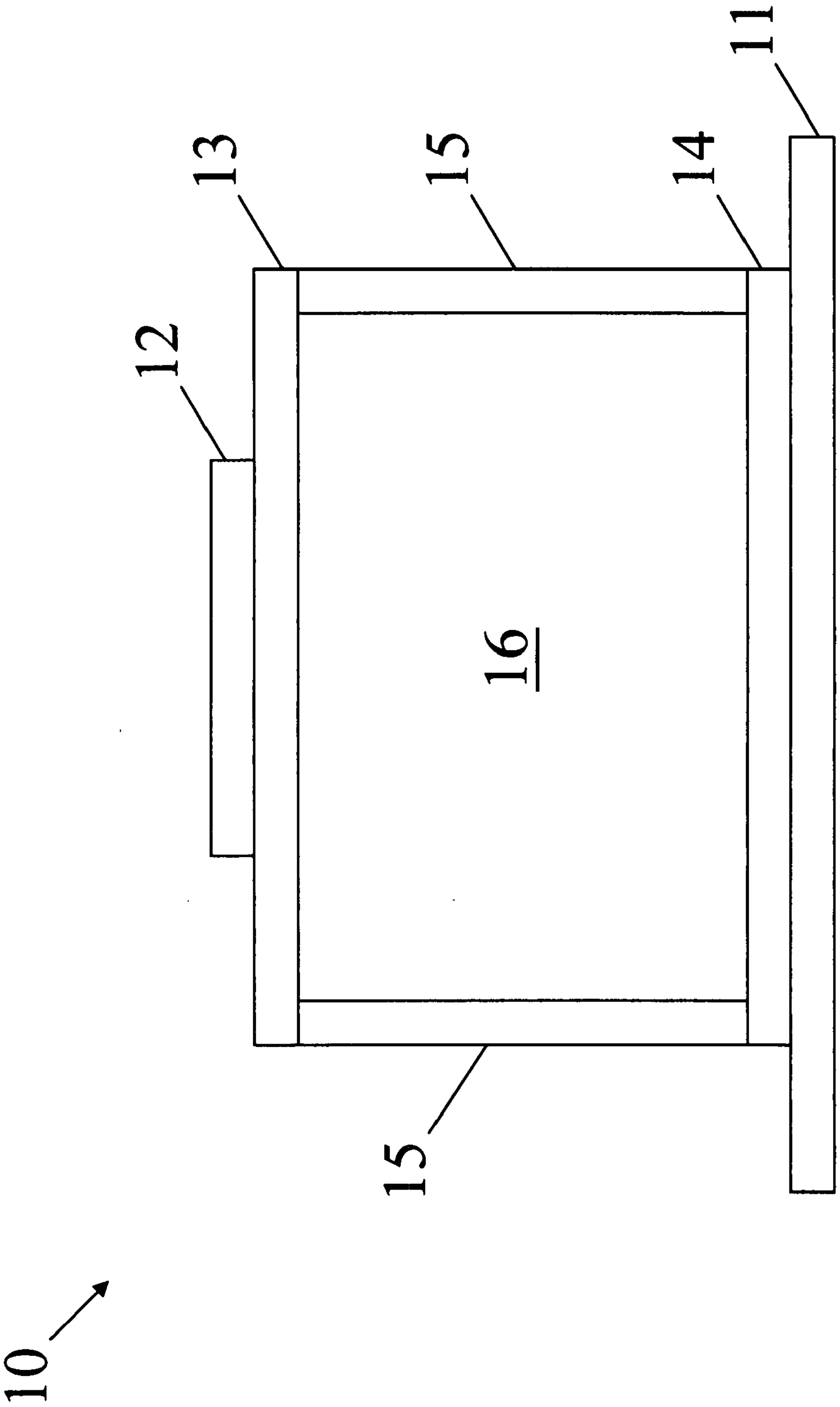
FIG. 1 (PRIOR ART)
FIG. 1 is a schematic cross-sectional view of a conventional capacitive ultrasonic transducer.
Figure 2A:
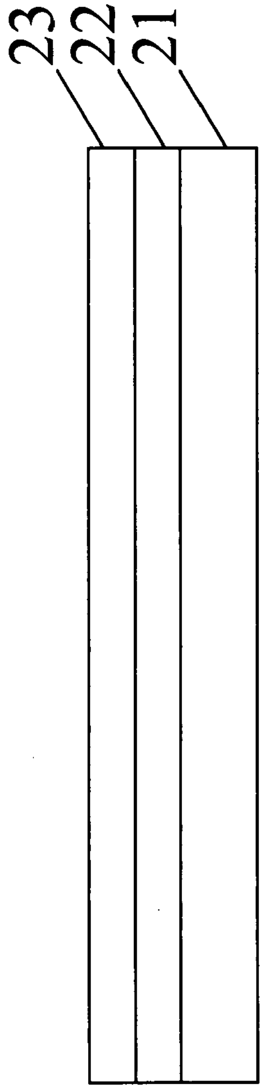
FIG. 2A (PRIOR ART)
FIGS. 2A to 2D are cross-sectional diagrams illustrating a conventional method for fabricating a capacitive ultrasonic transducer.
Figure 2B:
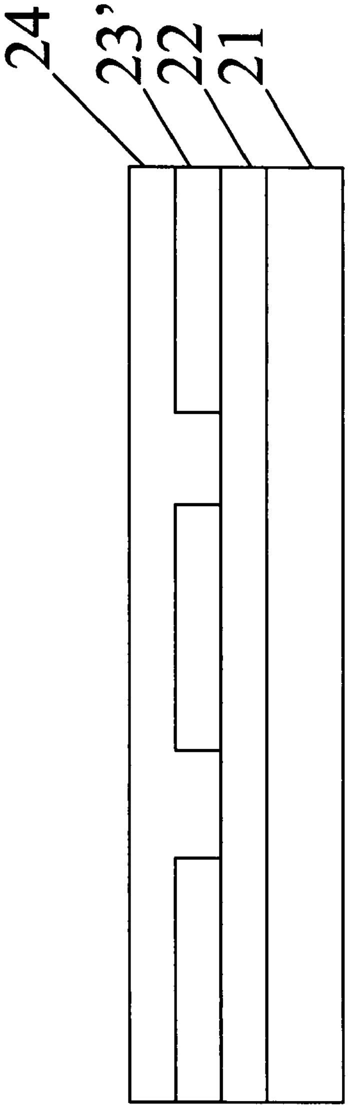
FIG. 2B (PRIOR ART)
Figure 2C:
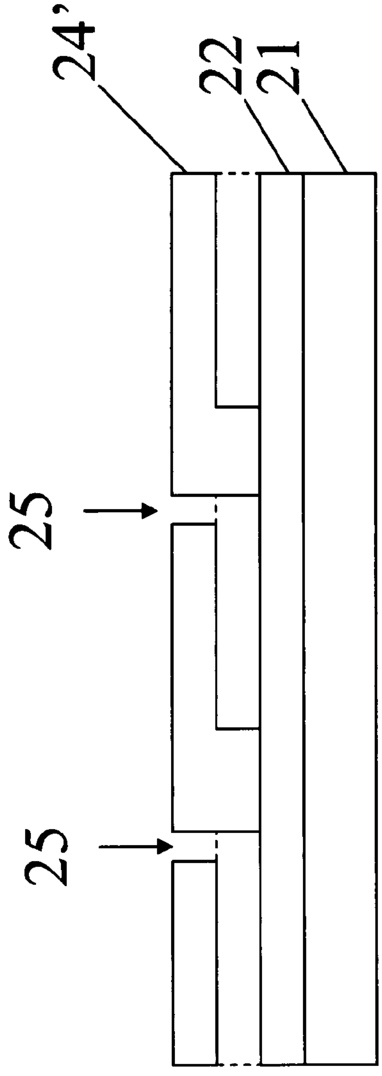
FIG. 2C (PRIOR ART)
Figure 2D:
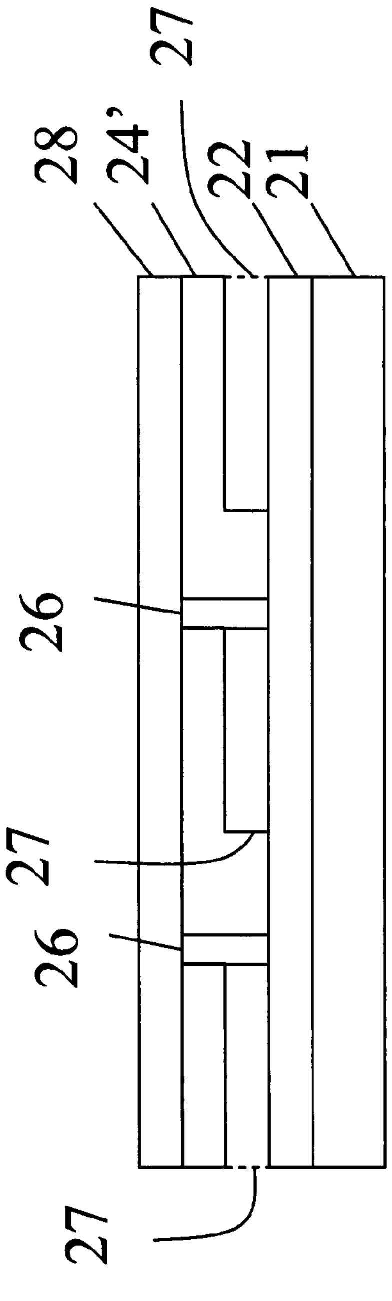
FIG. 2D (PRIOR ART)
Figure 3:
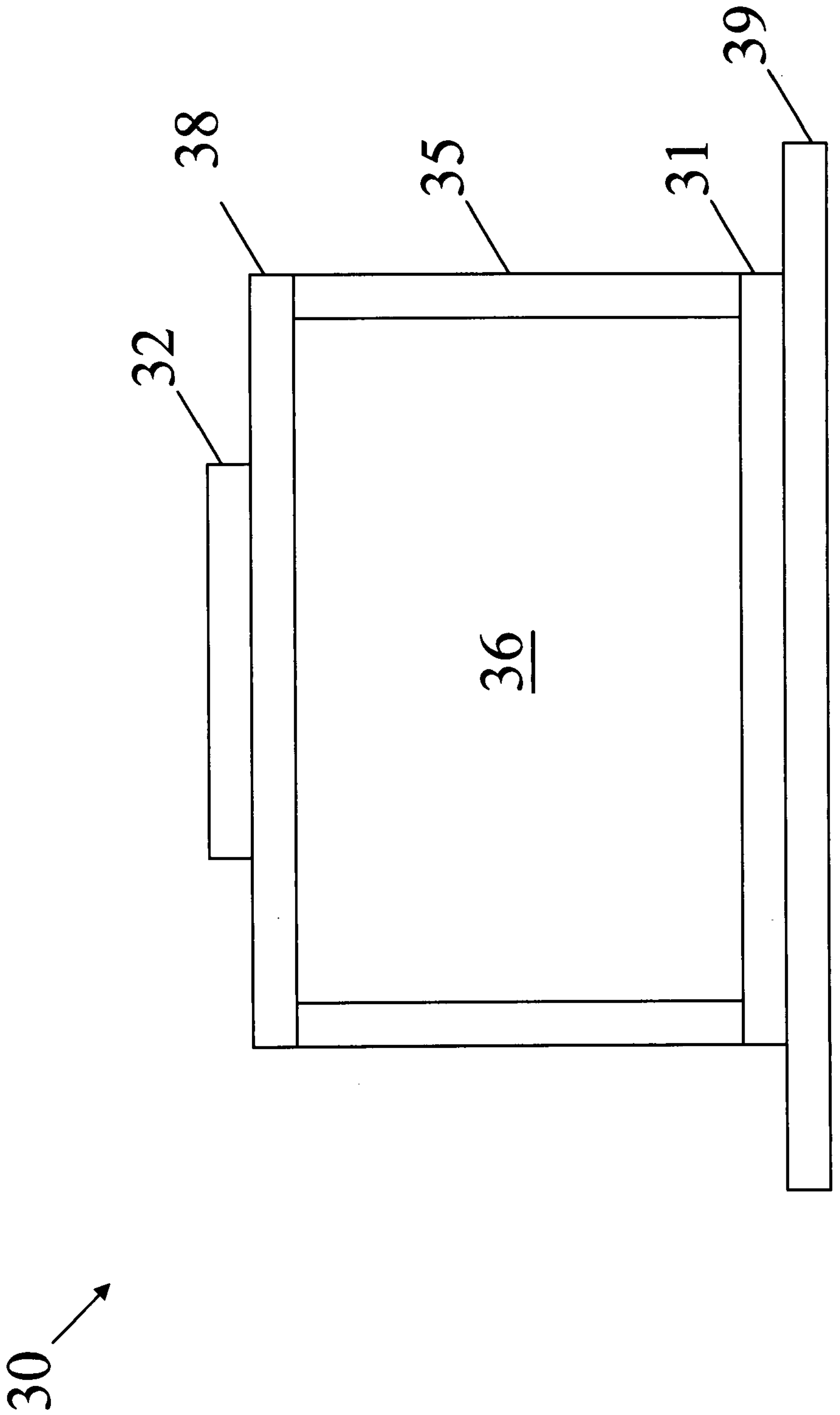
FIG. 3 is a schematic cross-sectional view of a flexible capacitive ultrasonic transducer consistent with an example of the present invention.

FIG. 3 is a schematic cross-sectional view of a flexible capacitive ultrasonic transducer 30 in accordance with one example of the present invention. Referring to FIG. 3, the flexible capacitive ultrasonic transducer 30 includes a flexible base 39, a first electrode 31, a support frame 35, a membrane 38 and a second electrode 32. The flexible base 39 may be made of a material such as, for example, polymer or other suitable material that may allow the capacitive ultrasonic transducer 30 to conform to a surface of an object. In one example, the flexible base 39 may have a thickness of approximately 0.45 micrometer (μm), the first electrode 31 may have a thickness of approximately 0.2 μm, and the second electrode 32 may have a thickness of 0.5 μm. The first electrode 31 may include a metal film made of platinum (Pt) or aurum (Au), and the second electrode 32 may include a metal film made of aluminum (Al). The first electrode 31 and the second electrode 32 may serve as a positive electrode and a negative electrode, respectively, of the capacitive ultrasonic transducer 30. The support frame 35 and the membrane 38 may be made of polymer. In one example, the membrane 38 has a thickness of approximately 2 μm and the support frame 35 separates the first electrode 31 and the membrane 38 by a distance of approximately 2 μm. A cavity 36 is defined by the first electrode 31, the support frame 35 and the membrane 38.

Figure 4A:
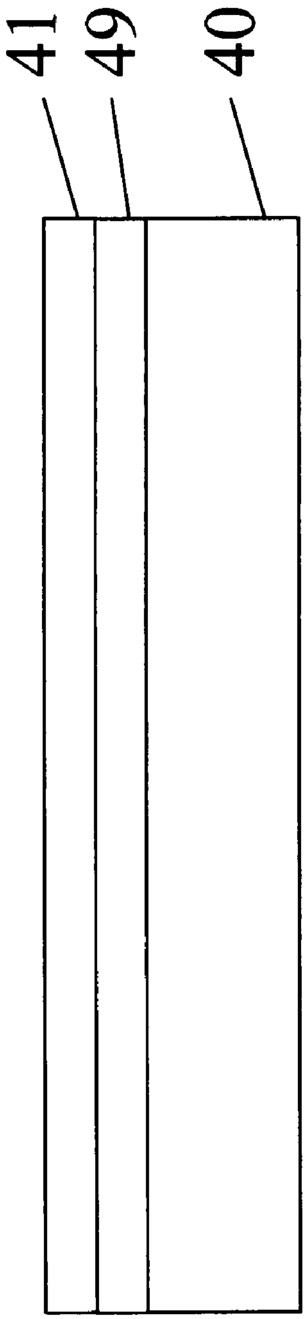
FIGS. 4A to 4J are schematic cross-sectional diagrams illustrating a method of fabricating a flexible capacitive ultrasonic transducer consistent with an example of the present invention.

FIGS. 4A to 4J are schematic cross-sectional diagrams illustrating a method for fabricating a flexible capacitive ultrasonic transducer in accordance with one example of the invention. Referring to FIG. 4A, a substrate 40 is provided to serve as a supporting base on which flexible capacitive ultrasonic transducers may be fabricated. The substrate 40 may include a silicon substrate having a thickness of approximately 550 μm. A flexible layer 49, which may eventually serve as a flexible base like the flexible base 39 illustrated in FIG. 3, is formed on the substrate 40 by a conventional coating process or other suitable processes. A conductive layer 41 is formed on the flexible layer 49 by a conventional sputtering process of other suitable processes. The conductive layer 41, which eventually serves as a first electrode for a capacitive ultrasonic transducer, may include a metal film such as a gold film.

Figure 4B:
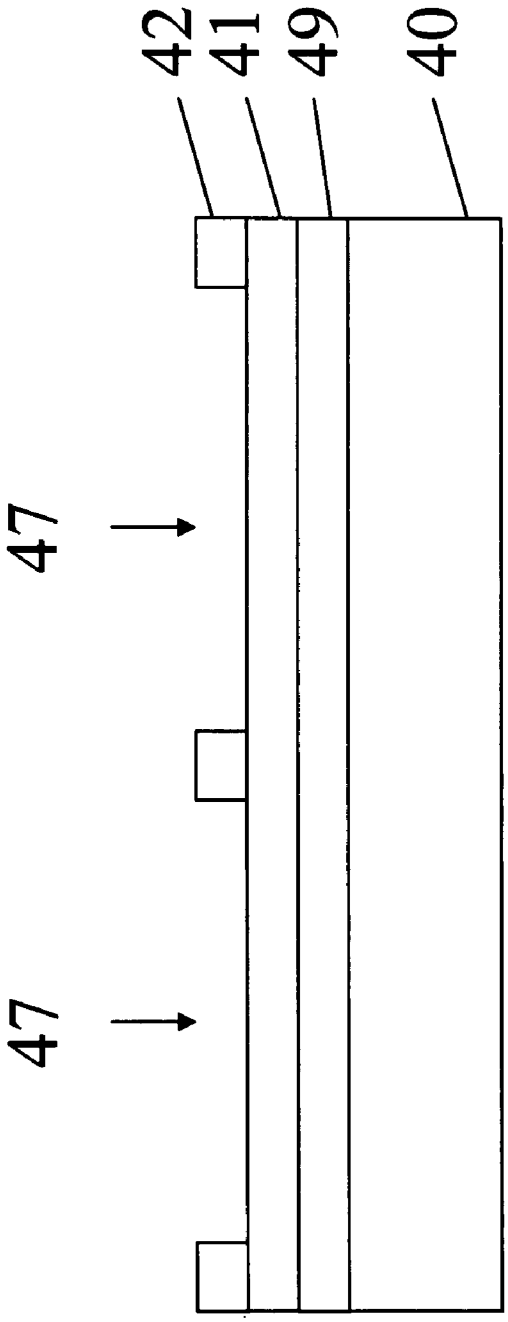

Referring to FIG. 4B, a patterned photoresist layer 42 is formed on the flexible layer 49 by a conventional patterning and etching process, exposing portions of the flexible layer 49 through openings 47. The patterned photoresist layer 42 may include a polymeric material such as, for example, AZ4620. The pattern of the openings 47 may include but is not limited to a hexagon.

Figure 4C:
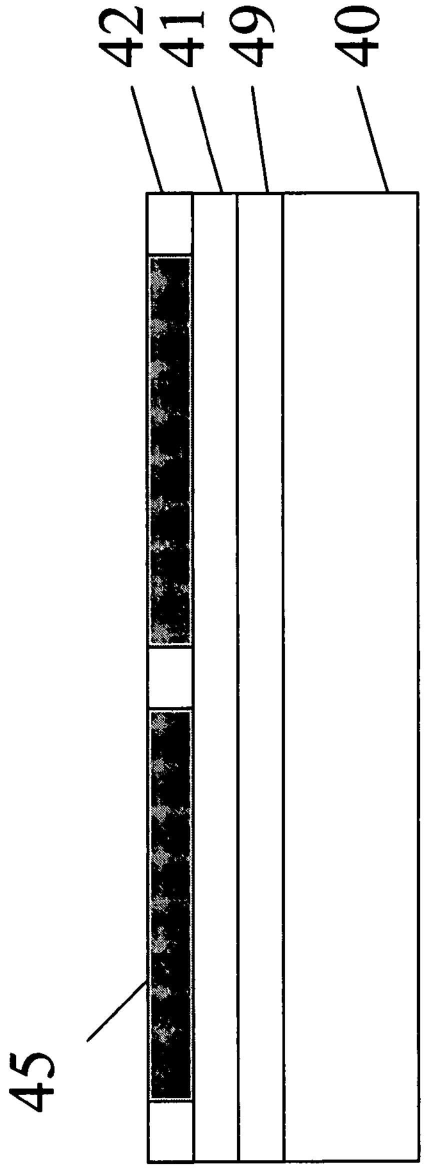

Referring to FIG. 4C, a sacrificial metal layer 45 is formed to fill the openings 47 by a conventional electroplating process or other suitable processes. The sacrificial metal layer 45 may be substantially coplanar with the patterned photoresist layer 42, and will be removed in a subsequent process so as to define a cavity. In one example according to the present invention, the sacrificial metal layer 43 includes copper (Cu).

Figure 4D:
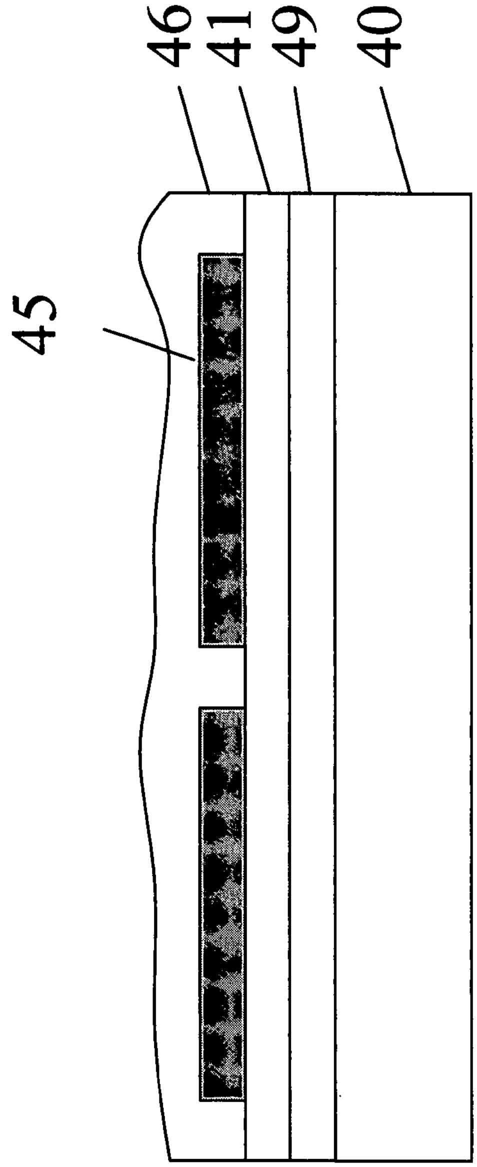

Referring to FIG. 4D, the patterned photoresist layer 42 is stripped and a first polymer layer 46 is formed over the sacrificial metal layer 43. In one example according to the present invention, the first polymer layer 46 includes a polymeric material such as, for example, SU8-2002.

Figure 4E:
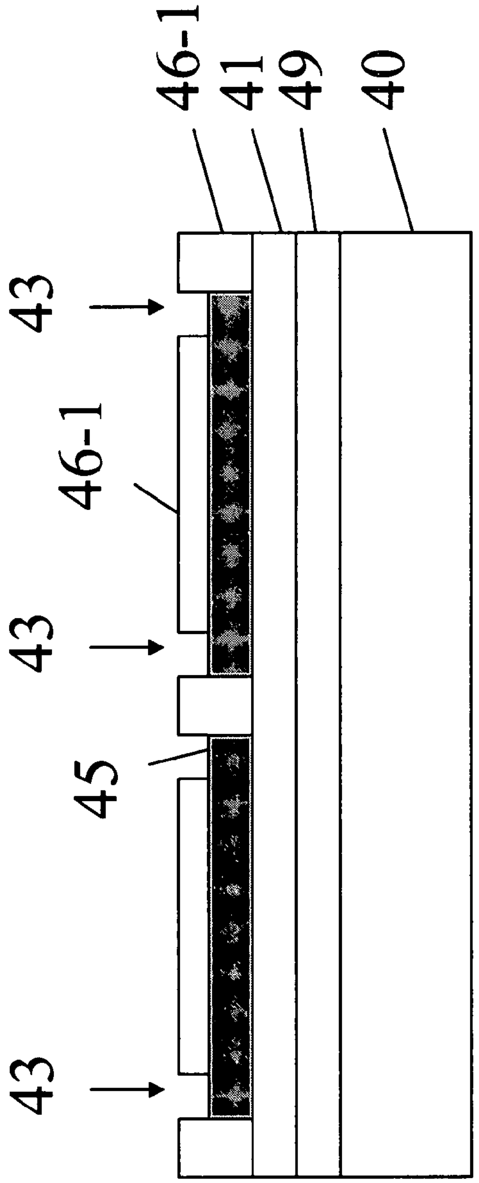

Referring to FIG. 4E, the first polymer layer 46 illustrated in FIG. 4D may then be lapped or polished by a conventional lapping or chemical machine polish (CMP) process. Next, a patterned first polymer layer 46-1 is formed by a conventional patterning and etching process, exposing portions of the sacrificial metal layer 43 through openings 43. The patterned first polymer layer 46-1 subsequently serves as a support frame and at least a portion of a membrane for the capacitive ultrasonic transducer.

Figure 4F:
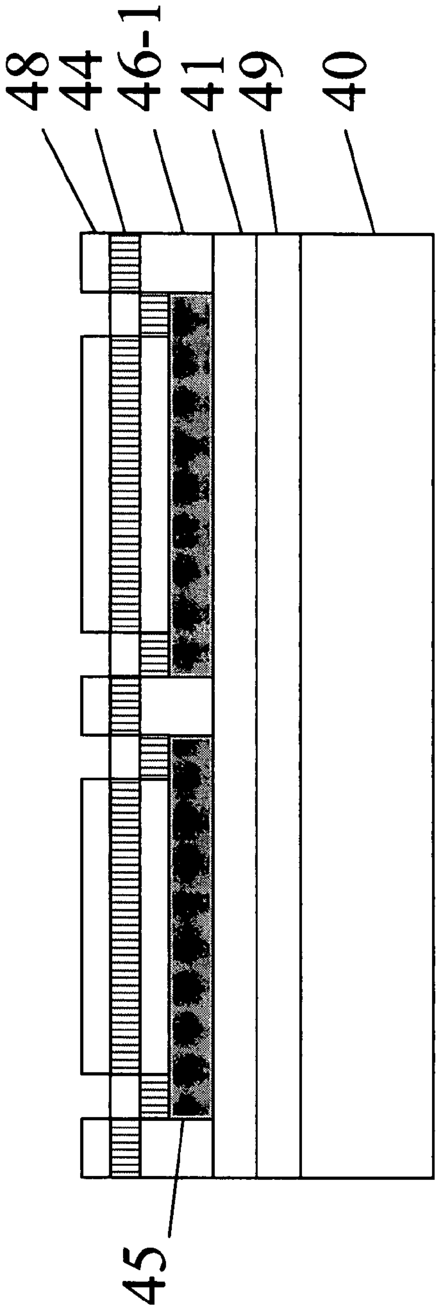

Referring to FIG. 4F, a conductive layer 44 is formed over the patterned first polymer layer 46-1 and the sacrificial metal layer 45 by a sputtering, evaporating or PECVD process. In one example, the conductive layer 44 includes Al. Next, a photoresist layer 48 is formed over the conductive layer 44. In one example, the photoresist layer 48 may include a positive photoresist, such as, for example, AZ5214E.

Figure 4G:
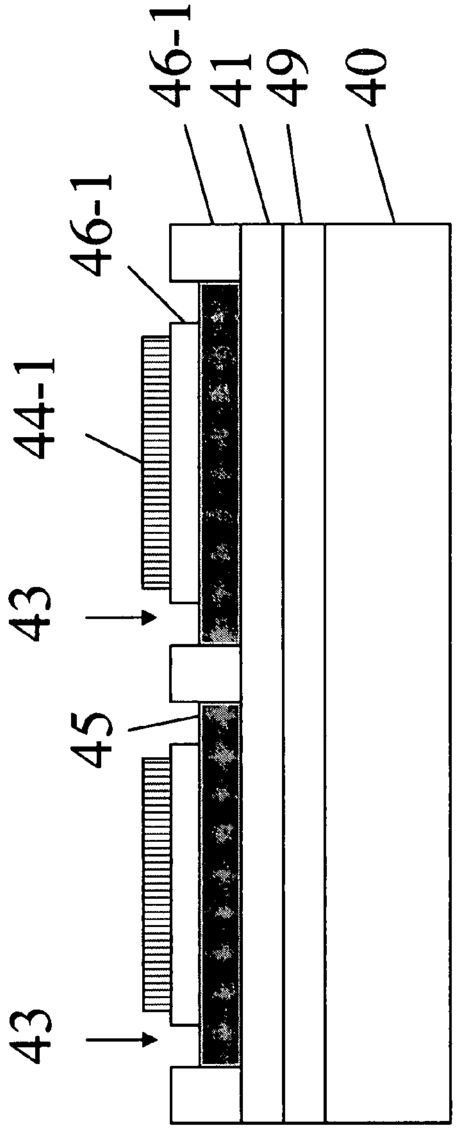

Referring to FIG. 4G, a patterned conductive layer 44-1 is formed on the patterned first polymer layer 46-1 by a conventional patterning and etching process. The patterned conductive layer 44-1 subsequently becomes a second electrode for the capacitive ultrasonic transducer.

Figure 4H:
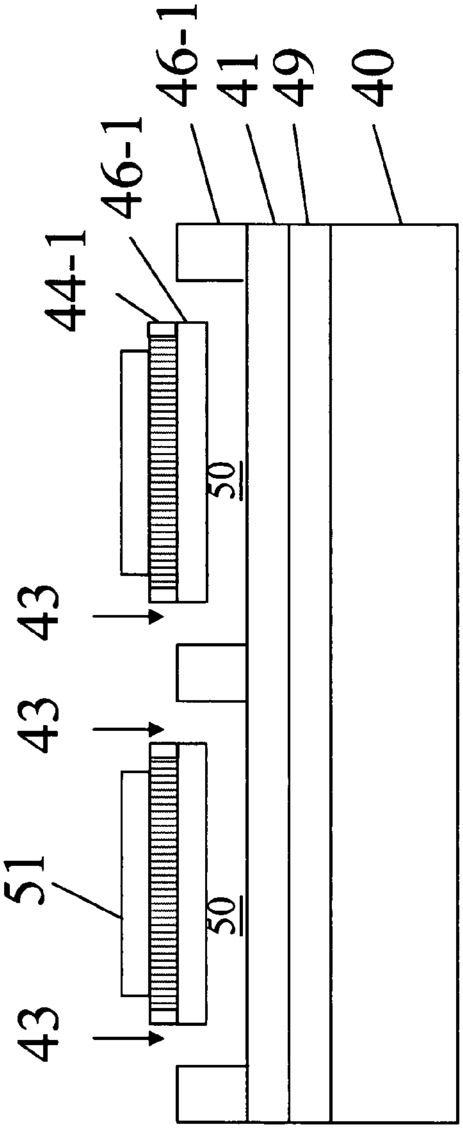

Referring to FIG. 4H, a patterned second polymer layer 51 is formed over the patterned first polymer layer 46-1 and the patterned conductive layer 44-1. The sacrificial metal layer 45 illustrated in FIG. 4G is removed via the openings 43 through an etching process. In one example, the sacrificial metal layer 45 is removed by a wet etching process using ferric chloride ($FeCl_3$) as an etchant solution, which is etch selective so that the sacrificial metal layer 45 is removed without significantly removing the conductive layer 41. Cavities 50 are therefore defined, but not sealed, by the conductive layer 41 and the patterned first polymer layer 46-1.

Figure 4I:
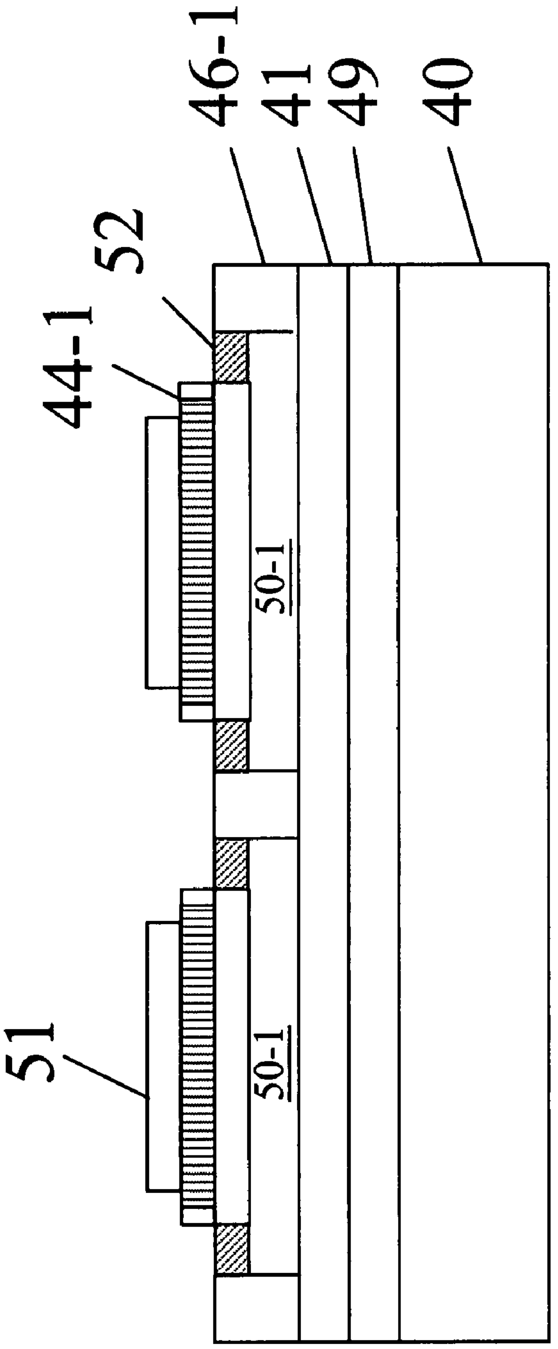
Figure 4J:
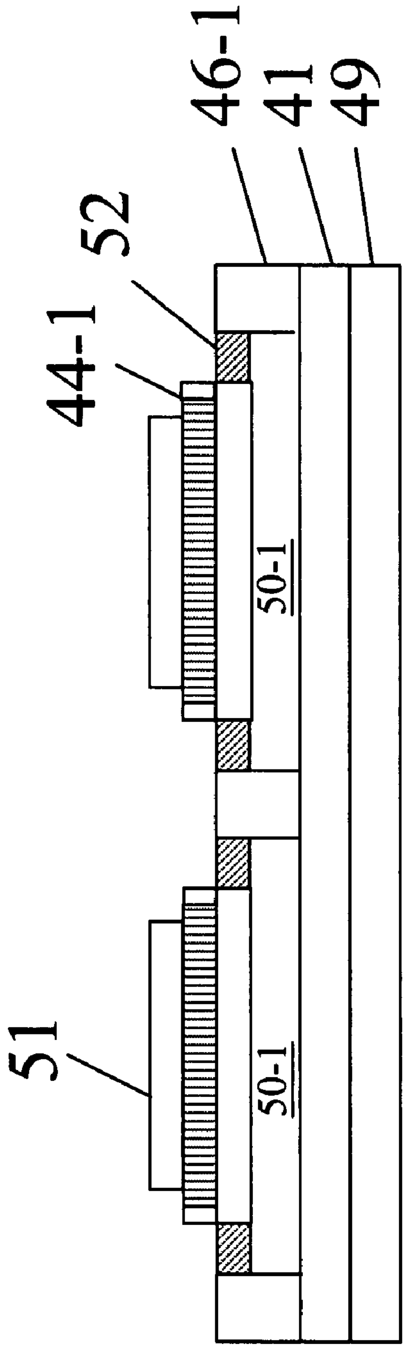

Referring to FIG. 4I, a patterned layer 52 may be formed to fill the openings 43 illustrated in FIG. 4H. The patterned layer 52 may include a polymer layer. Cavities 50-1 are therefore defined and sealed by the conductive layer 41, the patterned first polymer layer 46-1 and the patterned layer 52. Next, referring to FIG. 4J, the substrate 40 is removed after the capacitive ultrasonic transducers are formed. The method illustrated in FIGS. 4A to 4J may be controlled at a temperature lower than approximately 150° C. (Celsius).

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method for fabricating capacitive ultrasonic transducers, the method comprising: providing a substrate;

forming a flexible layer on the substrate;

forming a first conductive layer on the flexible layer;

forming a patterned sacrificial layer on the first conductive layer; forming a first polymer layer over the patterned sacrificial layer;

patterning the first polymer layer to provide a patterned first polymer layer, exposing portions of the patterned sacrificial layer through openings;

forming a second conductive layer on the patterned first polymer layer;

patterning the second conductive layer to provide a patterned second conductive layer;

forming a second polymer layer over the patterned second conductive layer;

patterning the second polymer layer, exposing portions of the patterned sacrificial layer through the openings; and removing the patterned sacrificial layer through the openings.

2. The method of claim 1, further comprising:

forming a patterned polymer layer to fill the openings.

3. The method of claim 1, wherein forming a patterned sacrificial layer on the first conductive layer comprises:

providing a photoresist layer on the first conductive layer;

patterning the photoresist layer to provide a patterned photoresist layer with openings;

forming a sacrificial layer to fill the openings; and removing the patterned photoresist layer.

4. The method of claim 3, wherein forming a sacrificial layer comprises:

electroplating a metal layer over the patterned photoresist layer to fill the openings.

5. The method of claim 1, wherein the first polymer layer and the second polymer layer include substantially the same material.

6. The method of claim 1, wherein the first polymer layer and the second polymer layer include SU8-2002.

7. A method of forming capacitive ultrasonic transducers, the method comprising: forming a flexible layer on a substrate;

forming a first conductive layer on the flexible layer;

forming a patterned metal layer on the first conductive layer;

forming a first polymer layer on the patterned metal layer and the first conductive layer;

patterning the first polymer layer to provide a patterned first polymer layer, exposing portions of the patterned metal layer through openings;

forming a patterned second conductive layer on the patterned first polymer layer;

forming a patterned second polymer layer on the patterned second conductive layer and the patterned first polymer layer over the patterned metal layer; and removing the patterned metal layer through the openings.

8. The method of claim 7, wherein forming the flexible layer on the substrate includes forming a polymer layer on the substrate.

9. The method of claim 8, wherein the patterned first polymer layer and the patterned second polymer layer include substantially the same material.

10. The method of claim 8, wherein the patterned first polymer layer and the patterned second polymer layer include SU8-2002.

11. The method of claim 8 further comprising forming a patterned third polymer layer to fill the openings.

12. The method of claim 7, wherein forming the first conductive layer on the flexible layer includes forming one of a platinum and a gold film on the flexible layer.

13. The method of claim 7, wherein forming the patterned metal layer on the first conductive layer further includes:

providing a photoresist layer on the first conductive layer;

patterning the photoresist layer to provide a patterned photoresist layer with openings;

forming a metal layer to fill the openings; and removing the patterned photoresist layer.

14. The method of claim 13 further comprising electroplating a metal layer over the patterned photoresist layer to fill the openings.

15. The method of claim 13 further comprising electroplating a copper layer over the patterned photoresist layer to fill the openings.

* * * * *